(12) United States Patent
Acker et al.

(10) Patent No.: US 6,589,679 B1
(45) Date of Patent: Jul. 8, 2003

(54) APPARATUS AND METHODS FOR SENSOR-LESS OPTIMIZATION OF METHANOL CONCENTRATION IN A DIRECT METHANOL FUEL CELL SYSTEM

(75) Inventors: William P. Acker, Rexford, NY (US); Michael S. Adler, Niskayuna, NY (US)

(73) Assignee: MTI MicroFuel Cells Inc., Albany, NY (US)

(*) Notice: Subject to any disclaimer, the term of this patent is extended or adjusted under 35 U.S.C. 154(b) by 131 days.

(21) Appl. No.: 09/721,290

(22) Filed: Nov. 22, 2000

(51) Int. Cl.[7] .............................. H01M 8/04; H01M 8/12
(52) U.S. Cl. ................................... 429/22; 429/23
(58) Field of Search .............................. 429/12, 13, 17, 429/22, 23

(56) References Cited

U.S. PATENT DOCUMENTS

| | | | |
|---|---|---|---|
| 4,046,956 A | 9/1977 | Fanciullo | |
| 4,593,534 A | 6/1986 | Bloomfield | |
| 4,673,624 A | 6/1987 | Hockaday | 429/41 |
| 4,810,597 A | 3/1989 | Kumagai et al. | 429/22 |
| 4,904,548 A * | 2/1990 | Tajima | 429/22 |
| 4,961,151 A * | 10/1990 | Early et al. | 180/65.8 |
| 5,460,896 A | 10/1995 | Takada et al. | |
| 5,523,177 A | 6/1996 | Kosek et al. | 429/40 |
| 5,573,866 A | 11/1996 | Van Dine et al. | 429/13 |
| 5,599,638 A | 2/1997 | Surampudi et al. | 429/33 |
| 5,631,099 A | 5/1997 | Hockaday | 429/30 |
| 5,723,228 A | 3/1998 | Okamoto | 429/12 |
| 5,759,712 A | 6/1998 | Hockaday | 429/30 |
| 5,763,113 A * | 6/1998 | Meltser et al. | 429/13 |
| 5,766,786 A * | 6/1998 | Fleck et al. | 429/17 |
| 5,773,162 A | 6/1998 | Fleck et al. | 429/17 |
| 5,795,668 A | 8/1998 | Banerjee | 429/33 |
| 5,916,699 A | 6/1999 | Thomas et al. | 429/3 |
| 5,925,476 A | 7/1999 | Kawatsu | |
| 5,945,229 A * | 8/1999 | Meltser | 429/13 |
| 5,945,231 A | 8/1999 | Narayanan et al. | 429/30 |
| 5,992,008 A | 11/1999 | Kindler | 29/730 |
| 6,096,449 A * | 8/2000 | Fuglevand et al. | 429/13 |
| 6,232,010 B1 | 5/2001 | Cisar et al. | |
| 6,265,092 B1 * | 7/2001 | Meltser et al. | 204/406 |
| 6,265,093 B1 | 7/2001 | Surampudi et al. | |
| 6,296,964 B1 * | 10/2001 | Ren et al. | 429/38 |
| 6,322,917 B1 | 11/2001 | Acker | |
| 6,350,540 B1 | 2/2002 | Sugita et al. | |
| 6,383,670 B1 * | 5/2002 | Edlund et al. | 422/108 |
| 6,410,180 B1 | 6/2002 | Cisar et al. | |
| 6,420,059 B1 | 7/2002 | Surampudi et al. | |

FOREIGN PATENT DOCUMENTS

| | | |
|---|---|---|
| SU | 1610522 A | 11/1999 |
| WO | WO 97/50140 A | 12/1997 |

OTHER PUBLICATIONS

"Fuel Cell", 1992 Fuel Cell Seminar, Program and Abstracts, pp. 233–236; 461–464.

"Miniaturized Fuel Cells for Portable Power", Helen L. Maynard and Jeremy P. Meyers, Lucent Technologies, 2000.

"Pocket–size PEMs", Paul Sharke, Mechanical Engineering.

"Polymer Electrolyte Fuel Cells as Potential Power Sources for Portable Electronic Devices", Shinshon Gottesfeld and Mahlon S. Wilson, pp. 487–517.

(List continued on next page.)

*Primary Examiner*—Carol Chaney
*Assistant Examiner*—Donald V. Scaltrito
(74) *Attorney, Agent, or Firm*—Cesari and McKenna, LLP (57) ABSTRACT

Apparatus and methods for regulating methanol concentration in a direct methanol fuel cell system are provided. The apparatus and methods do not require a methanol concentration sensor. One or more operating characteristics of the fuel cell, such as the potential across the load, open circuit potential or potential at the anode proximate to the end of the fuel flow path, are used to actively control the methanol concentration.

14 Claims, 6 Drawing Sheets

OTHER PUBLICATIONS

International Search Report for International Application No.: PCT/US01/42960, International Filing Date: Nov. 20, 2001, all pages.

Ren, Xiaoming et al. Methanol Cross–Over In Direct Methanol Fuel Cells, Electronic and Electrochemical Materials and Devices, MST–11, MS–D429, Los Alamos National Laboratory, NM, pp. 284–293.

Narayanan, et al. "Electrochemical Characteristics of Carbon–Supported Pt, Pt–Sn, Pt–Ru Electrodes for the Oxidation of Methanol and Formaldehyde", From Fuel Cell Program and Abstracts, 1992 Fuel Cell Seminar, pp. 233–236 and 461–464.

Maynard et al. Miniaturized Fuel Cells for Portable Power, Presented at Conference on Small Fuel Cells and Battery Technologies 2000, New Orleans, LA, all pages.

Sharke, Paul. Pocket–Size PEMs, Http://www.memagazine.org/contents/current/features/pems/pems.html, Jul. 25, 2000, all pages.

Gottesfeld, et al. Polymer Electrolyte Fuel Cell as Potential Power Sources for Portable Electronic Devices, pp. 487–517.

U.S. Patent Application Publication, No.: US 2002/0155341 A1, Pub. Date: Oct. 24, 2002, by Finkelshtain et al., all pages.

* cited by examiner

APPARATUS AND METHODS FOR SENSOR-LESS OPTIMIZATION OF METHANOL CONCENTRATION IN A DIRECT METHANOL FUEL CELL SYSTEM

BACKGROUND OF THE INVENTION

1. Field of the Invention

The present invention relates generally to the field of fuel cells and, more specifically, to a direct methanol fuel cell system in which active control of the concentration of methanol at a critical point within the cell allows dynamic response to changes in power demand while minimizing crossover of methanol through the cell's membrane.

2. Background Information

Fuel cells are devices in which an electrochemical reaction is used to generate electricity. A variety of materials may be suitable for use as a fuel, depending upon the materials chosen for the components of the cell. Organic materials, such as methanol or formaldehyde, are attractive choices for fuels due to their high specific energies.

Fuel cell systems may be divided into "reformer based" (i.e., those in which the fuel is processed in some fashion before it is introduced into the cell) or "direct oxidation" in which the fuel is fed directly into the cell without internal processing. Most currently available fuel cells are of the reformer-based type, and their fuel processing requirement limits their application to relatively large applications relative to direct oxidation systems.

An example of a direct oxidation system is the direct methanol fuel cell system or DMFC. In a DMFC, the electrochemical reaction at the anode is a conversion of methanol and water to $CO_2$, $H^+$ and $e^-$. The hydrogen ions flow through a membrane electrolyte to the cathode, while the free electrons flow through a load which is normally connected between the anode and cathode. At the cathode, oxygen reacts with hydrogen ions and free electrons to form water.

In addition, conventional DMFCs suffer from a problem which is well known to those skilled in the art: cross-over of methanol from the anode to the cathode through the membrane electrolyte, which causes significant loss in efficiency. Cross-over occurs because of the high solubility of methanol in the membrane electrolyte. In order to minimize cross-over, and thereby minimize the loss of efficiency, the concentration of methanol in the fuel feed stream is kept low (e.g., below 1M) by dilution with water. However, dilution of the methanol introduces other disadvantages: (1) the fuel cell's construction becomes more complicated and costly because of the structures and processes needed to store and manage the water; and (2) the energy per unit volume of the fuel cell, which is a critical factor in terms of the fuel cell's potential commercial applications, is reduced.

Many important applications of DMFCs require that the power source be able to vary its output in response to constantly changing electrical loads. There is a direct relationship between the electric load and the amount of methanol consumed. As such, it is desirable to vary the amount of methanol that is fed into the fuel cell, to supply slightly more fuel to the fuel cell than is consumed by the reaction that generates electricity. However, supplying substantially more fuel than is requires has several disadvantages: it increases methanol crossover, which decreases efficiency of the system; in an open anode configuration, it increases the amount of fuel that passes through without reacting, thus wasting fuel; and in a closed anode configuration, it increases the volume of unreacted fuel that must be recirculated, consuming energy and increasing the demands on the system.

It is known to those skilled in the art that conventional efforts to actively control the methanol concentration, for the purposes of regulating the power output of a DMFC system and minimizing cross-over, have been accompanied by another disadvantage. In order to effect control using conventional methods, a methanol concentration sensor must be provided, the presence of which tends to further increase the cost and complexity of the fuel cell system as well as introduce an additional component whose failure could significantly affect performance.

SUMMARY OF THE INVENTION

The present invention provides a direct methanol fuel cell system in which the concentration of methanol supplied to the anode is actively controlled so as to optimize the performance of the system, and minimize cross-over, but without the need for a methanol concentration sensor. The present invention monitors one or more of the fuel cell's operating characteristics, such as the potential across the load or the open circuit potential. A preferable choice of operating characteristic is one for which a known relationship exists between that characteristic and methanol concentration. In this fashion, the monitored characteristic may be used, directly or indirectly, to generate a control signal which is supplied to a regulator. The regulator, which is coupled to sources of methanol and water and responsive to the control signal, functions to increase or decrease the concentration of methanol supplied to the anode.

In a first embodiment, the potential across the load or fuel cell stack is detected. Periodically, the flow of methanol is reduced or interrupted. As the methanol concentration drops, the potential across the load drops. By measuring the time required for the potential to drop to a predetermined value or the rate at which the potential drops, an initial methanol concentration may be determined and used to calculate or retrieve from a memory appropriate values for adjusting the concentration.

In a second embodiment, the potential is detected at a portion of the anode which is proximate to the end of the methanol flow path. Because the methanol concentration is normally lowest at the end of the flow path, the proximate portion of the anode is highly sensitive to changes in methanol concentration. The detected potential is compared to a predetermined reference or to the potential at another point of the anode which is upstream in the flow path, the difference being used to adjust the concentration.

In a third embodiment, the load is periodically disconnected from the fuel cell, thereby creating brief periods of time in which the open circuit potential of the fuel cell is detected. The detected potential is stored and compared to a previously stored value which represents the detected potential at an earlier time or a predetermined reference. Because the fuel cell's open circuit potential decreases as a result of methanol cross-over, the difference in the compared potentials may be used to adjust the methanol concentration.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
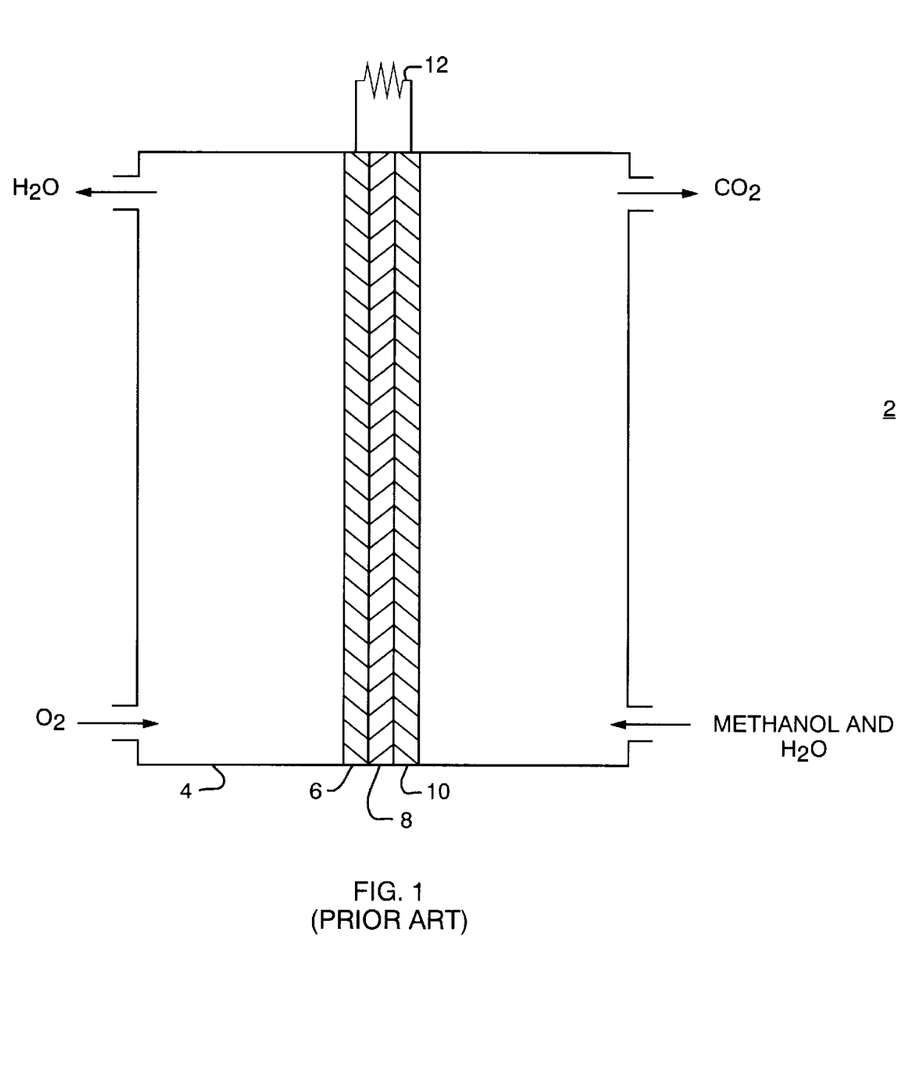
FIG. 1 is a block diagram of a direct methanol fuel cell known in the prior art.

FIG. 1 shows a conventional direct methanol fuel cell 2 in which a housing 4 encloses a cathode 6, a membrane electrolyte 8 and an anode 10. A load 12 is connected across cathode 6 and anode 10. Methanol and water are introduced into the anode side of housing 4 while oxygen is introduced into the cathode side of the housing. The source of the oxygen is preferably ambient air, but it should be understood that other sources could be used. As a result of the reactions at the anode and cathode, free electrons flow from anode 10 through load 12 to cathode 6, while hydrogen ions flow from anode 10 through membrane 8 to cathode 6. So long as the reactions continue, a current is maintained through load 12.

Figure 2:
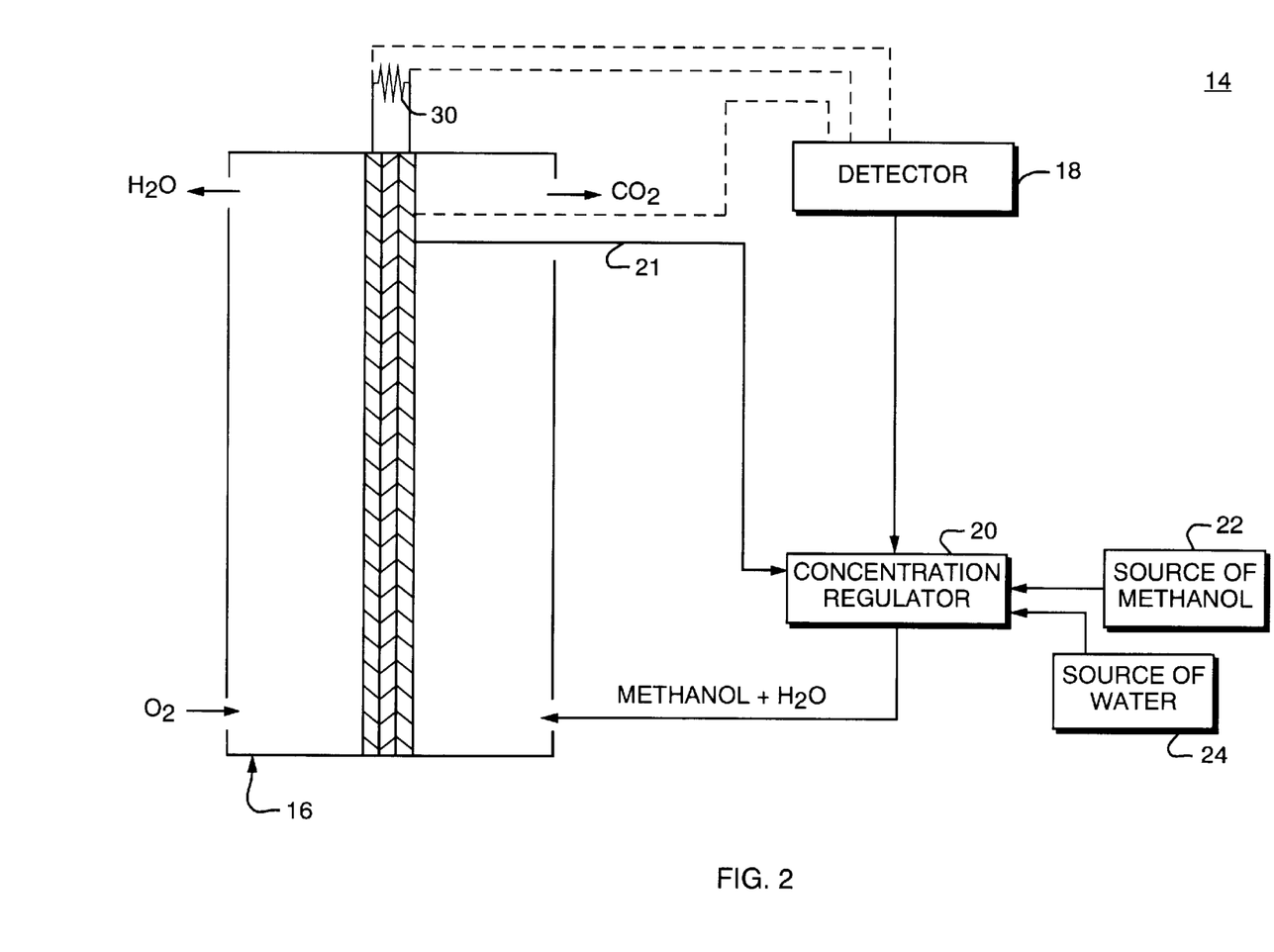
FIG. 2 is a block diagram of a direct methanol fuel cell system constructed in accordance with a preferred embodiment of the present invention.

FIG. 2 shows a direct methanol fuel cell system 14 which includes a direct methanol fuel cell 16, like that shown in FIG. 1, which provides electricity to a load 30. System 14 also includes a detector 18, a concentration regulator 20, a source of methanol 22 and a source of water 24, which may represent water generated on the cathode side, water from an internal source, or a combination of both. Detector 18 is coupled across load 30 or to one or more points in the interior of fuel cell 16 and, as described in detail below, functions to measure one or more operating characteristics that are either directly or indirectly indicative of the concentration of methanol within fuel cell 16. Detector 18 generates a control signal which is supplied to concentration regulator 20. Concentration regulator 20, via flow path 21, receives unreacted methanol and water from fuel cell 16. In response to the control signal, regulator 20 operates to adjust the concentration of methanol supplied to fuel cell 16.

Regulator 20 may be implemented using a metering valve, a pump, a combination of a valve and pump, or any of a number of other conventional devices which are capable of controlling a flow of liquid and compatible with the control signal generated by detector 18. It should be understood that while concentration regulator 20 is shown coupled to both sources 22 and 24, it is of course possible to control the concentration of methanol delivered to fuel cell 16 by regulating either the flow of methanol or water or both.

Figure 3:
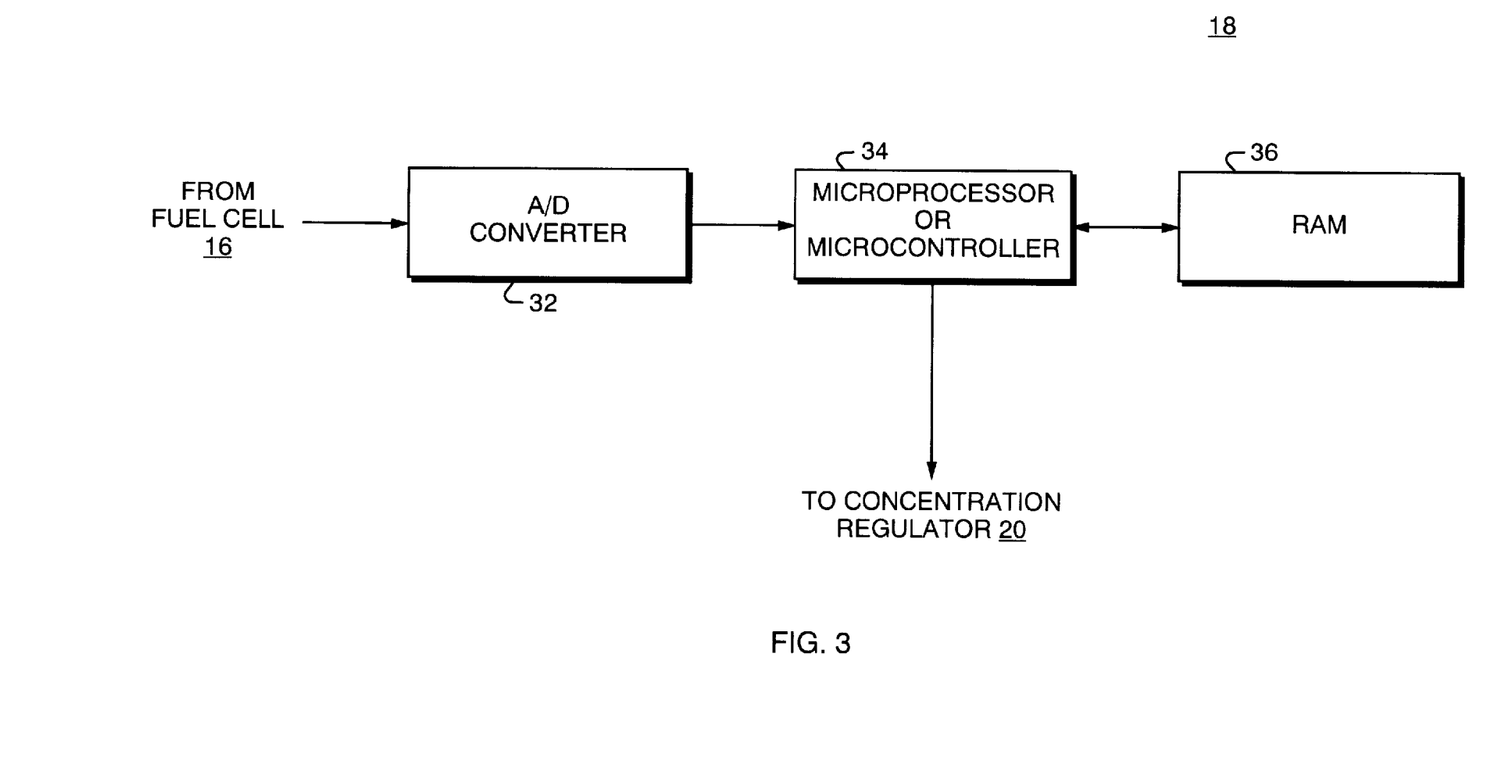
FIG. 3 is a block diagram of one embodiment of the sensor/detector shown in FIG. 2.

FIG. 3 shows one embodiment of detector 18. An analog to digital (A/D) converter 32 is connected to receive an analog signal (e.g. a potential) from fuel cell 16. Converter 32 produces a digital output signal which is supplied to a microprocessor or microcontroller 34. Microprocessor 34 is connected to a random access memory (RAM) 36. Microprocessor 34 may also be connected to a read only memory (ROM) (not shown) or other ancillary circuitry depending upon the requirements of a particular application. By loading RAM 36 with appropriate instructions and data, microprocessor 34 may be programmed in a well known manner to adjust the methanol concentration using one or more of the methods described below in connection with FIGS. 4–6.

It should be understood that a wide variety of other circuits or devices could be used for detector 18 depending upon which operating characteristic of the fuel cell 16 is of interest. For example, the combination of a half-wave rectifier and a comparator could be used to monitor a potential produced by the fuel cell 16, compare the potential to a reference, and use the difference as a control signal for methanol regulator 20.

Figure 4:
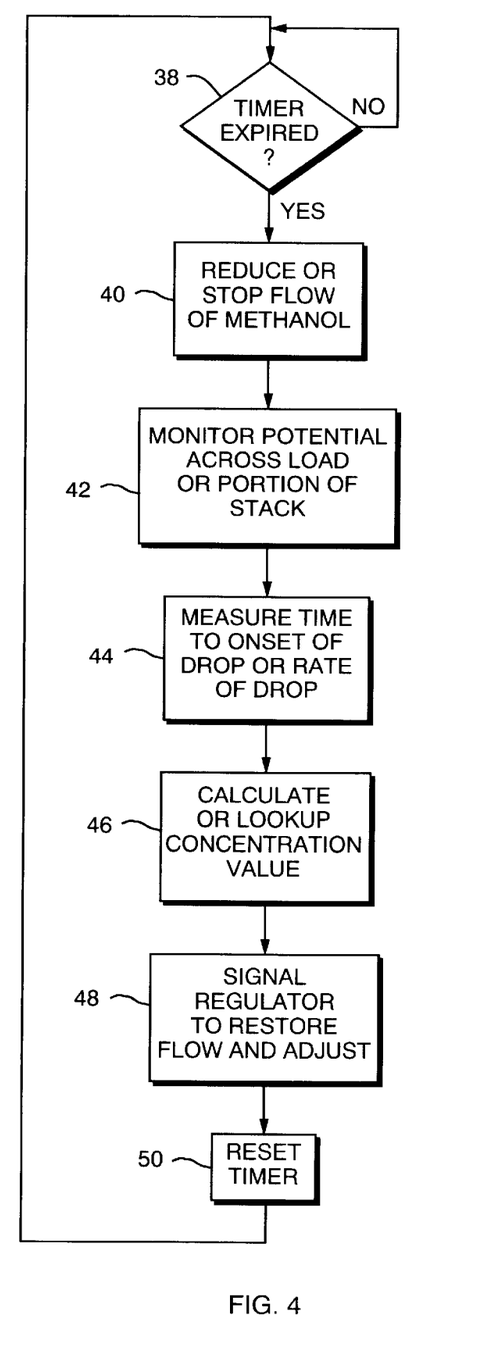
FIG. 4 is a flowchart of a first method of controlling methanol concentration in the fuel cell system of FIG. 2.

With reference now to FIGS. 3 and 4, a first method for regulating methanol concentration is shown. At step 38, a timer is tested to determine whether it has expired. If the timer has not expired, the process essentially waits. If the timer has expired, which indicates that it is time for a possible methanol concentration adjustment, the process advances to step 40 where microprocessor 34, through its control signal to regulator 20, causes the flow of methanol to be reduced or interrupted. Next, at step 42, the potential across load 30 (FIG. 2) or, if desired, some portion of the fuel cell stack is monitored and converted by A/D converter 32.

The potential across the load exhibits a non-linear relationship with methanol concentration in which the potential decreases gradually as the concentration decreases over a certain range, followed by a rapid decrease as the concentration falls below a level needed to sustain an efficient reaction. At step 44, microprocessor 34 may measure the is elapsed time between the interruption of methanol flow and the decrease of potential across the load or the rate of decrease of that potential. Next, at step 46, microprocessor 34 may either calculate or retrieve from a database or other data structure that may be stored in RAM 36 a value to supply as the control signal to the concentration regulator.

At step 48, microprocessor 34 signals regulator 20 to restore and adjust the flow of methanol or water to optimize the methanol concentration. Lastly, at step 50, the timer is reset and the process returns to begin again.

Figure 5:
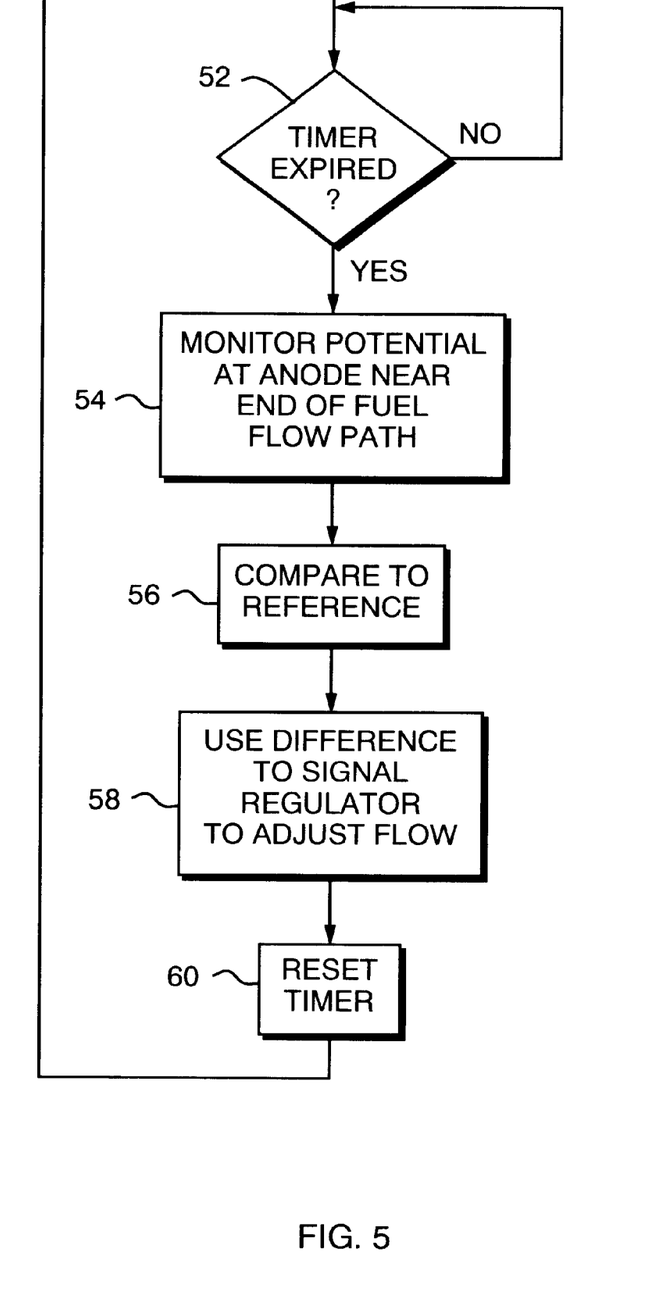
FIG. 5 is a flowchart of a second method of controlling methanol concentration in the fuel cell system of FIG. 2.

FIG. 5 shows an alternative method for effecting methanol concentration control. Again, the process begins, at step 52, with a determination whether a timer has expired. If so, the process proceeds to step 54 where the potential is monitored at a portion of the anode of the fuel cell that is proximate to the end of the methanol/water flow path (i.e., the farthest point from where methanol/water mixture enters the fuel cell housing). That point is preferably chosen because the methanol concentration is normally lowest there and the proximate portion of the anode is therefore very sensitive to changes in concentration.

At step 56, the potential is compared to a reference (e.g., a predetermined value stored in RAM 36 or possibly an earlier value of the monitored potential that was previously stored) and the difference, if any, is then used to signal regulator 20 to adjust the flow of methanol or water at step 58. At step 60, the timer is reset and the process begins again.

Figure 6:
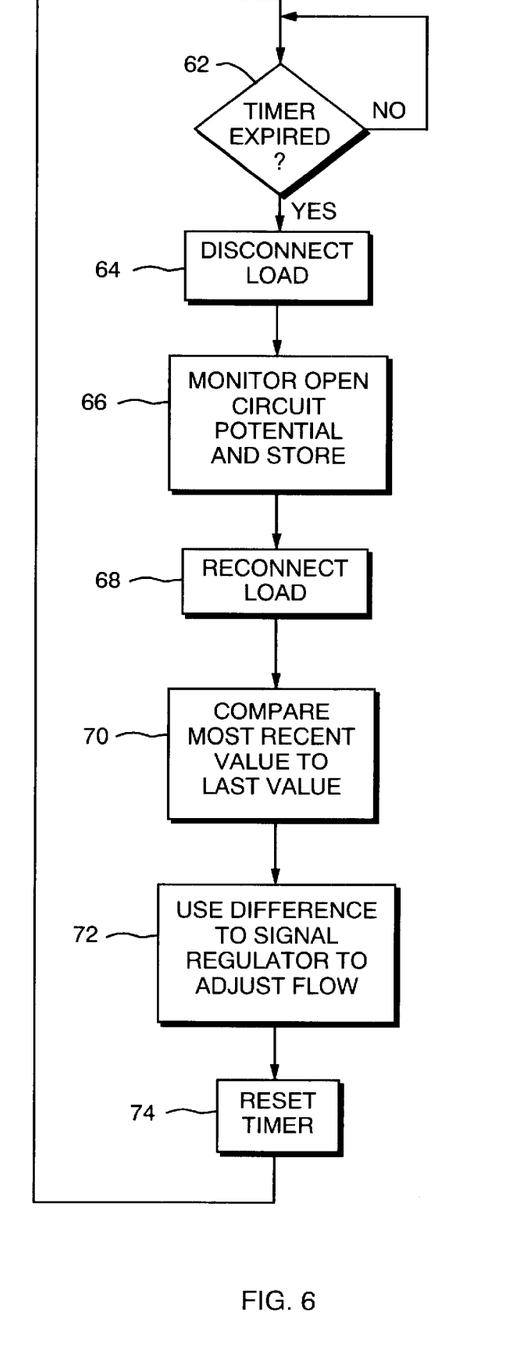
FIG. 6 is a flowchart of a third method of controlling methanol concentration in the fuel cell system of FIG. 2.

FIG. 6 shows another alternative method for controlling methanol concentration. In this method, following the expiration of a time at step 62, the load is temporarily disconnected from the fuel cell 16. This may be accomplished by a microswitch or similar device (not shown) that is controlled by microprocessor 34. Next, at step 66, the open circuit potential of fuel cell 16 is monitored and stored. The open circuit potential of the fuel cell is of interest because that potential decreases as methanol cross-over occurs.

At step 68, the load is reconnected to the fuel cell 16. At step 70, the most recent value of the open circuit potential is compared to a previously stored value (or to a predetermined reference) and the difference, if any, is again used to signal methanol regulator 20 to adjust the flow of methanol or water as appropriate at step 72. At step 74, the timer is reset and the process begins again.

It should be understood that other operating characteristics of the fuel cell which have known or derivable relationships to methanol concentration may also be used with the present invention.

What is claimed is:

1. A method of regulating methanol concentration in a direct methanol fuel cell system comprising:

providing a concentration regulator, coupled to a source of methanol or a source of water or both, and responsive to a control signal for increasing or decreasing the concentration of methanol supplied to said fuel cell;

periodically reducing or interrupting the amount of methanol supplied to said fuel cell;

in response, sensing a potential across a load connected to said fuel cell to make a determination of at least one of:
  (i) an amount of time needed for said potential to change or to begin to decrease;
  (ii) a rate of decrease of said potential; and
  using said determination to generate said control signal whereby the concentration of methanol supplied to said direct methanol fuel cell is increased or decreased by said concentration regulator.

2. A method as in claim 1 wherein a potential across a portion of the fuel cell stack is sensed instead of the potential across said load.

3. A method as in claim 1 wherein one or more of said sensing, determining and using steps is performed by a microprocessor or microcontroller.

4. A method of regulating methanol concentration in a direct methanol fuel cell system comprising:

providing a concentration regulator, coupled to a source of methanol or a source of water or both, and responsive to a control signal for increasing or decreasing the concentration of methanol supplied to said fuel cell;

sensing electric potential at a portion of an anode of said fuel cell which is proximate to an end of a methanol flow path;

comparing said electric potential to a reference; and generating said control signal in response to said comparison.

5. A method as in claim 4 wherein one or more of said sensing, determining and using steps is performed by a microprocessor or microcontroller.

6. A method of regulating methanol concentration in a direct methanol fuel cell system comprising:

providing a concentration regulator, coupled to a source of methanol or a source of water or both, and responsive to a control signal for increasing or decreasing the concentration of methanol supplied to said fuel cell;

periodically disconnecting a load from said fuel cell and sensing an open circuit potential of said fuel cell;

storing a value representing said sensed potential;

comparing said stored value to a previously stored value which represents the sensed potential at an earlier time or to a predetermined reference; and generating said control signal in response to a difference between said compared values.

7. A method as in claim 6 wherein one or more of said sensing, determining and using steps is performed by a microprocessor or microcontroller.

8. A direct methanol fuel cell system comprising:

a direct methanol fuel cell, having an anode and a cathode and a catalyzed membrane;

a source of air or oxygen coupled to the fuel cell;

a source of methanol coupled to said anode;

a source of water coupled to said source of methanol;

a means for interrupting or reducing a flow of methanol from said source of methanol, or a flow of water from said source of water;

a detector for detecting changes upon said interruption or reduction in the flow of methanol or water, in one or more operating characteristics of said fuel cell, and responsively producing a control signal; and a concentration regulator coupled to the source of methanol or to the source of water or both sources, and to the detector and the anode or the cathode, said regulator responsive to said control signal for varying the concentration of said methanol in said fuel cell such that cross-over of methanol is substantially minimized.

9. The system as in claim 8 wherein said detector comprises an analog to digital converter coupled to receive a potential indicative of said one more operating characteristics, and a microprocessor or microcontroller, coupled to said analog to digital converter and a memory, for generating said control signal.

10. The system as in claim 8 wherein said concentration regulator comprises a metering valve, a pump, or a combination thereof.

11. The system as in claim 8 wherein said detector detects changes in a potential across a load connected to said fuel cell and determining an amount time needed for said potential to begin to decrease or a rate of decrease of said potential.

12. The system as in claim 8 wherein said detector detects changes in a potential across a portion of the fuel cell stack.

13. The system as in claim 8 wherein said detector detects changes in a potential at a portion of an anode of said fuel cell which is proximate to an end of a methanol flow path.

14. The system as in claim 8 wherein said detector detects changes in an open circuit potential of said fuel cell.

* * * * *